United States Patent [19]

Farahar

[11] 3,945,782

[45] Mar. 23, 1976

[54] CONCRETE PIPES

[75] Inventor: Robert M. Farahar, Sevenoaks, England

[73] Assignee: Amey Roadstone Corporation Limited, London, England

[22] Filed: July 7, 1975

[21] Appl. No.: 593,790

Related U.S. Application Data

[62] Division of Ser. No. 370,145, June 14, 1973.

[30] Foreign Application Priority Data

July 27, 1972 United Kingdom............... 35184/72

[52] U.S. Cl.................. 425/127; 425/258; 425/435
[51] Int. Cl.$^2$.. B29C 5/00; B29D 3/02; B29D 23/08
[58] Field of Search........ 425/126 R, 127, 256, 258, 425/259, 433, 435

[56] References Cited
UNITED STATES PATENTS

| | | | |
|---|---|---|---|
| 1,961,260 | 6/1934 | Ukropina......................... | 425/435 X |
| 2,932,874 | 4/1960 | Ludwig et al..................... | 425/435 X |
| 3,114,173 | 12/1963 | Boggs et al. ........................ | 425/126 |
| 3,206,821 | 9/1965 | Keyser et al..................... | 425/435 X |
| 3,280,232 | 10/1966 | Lander et al. .................... | 425/435 X |
| 3,587,137 | 6/1971 | Baldridge........................ | 425/435 X |

Primary Examiner—J. Howard Flint, Jr.
Attorney, Agent, or Firm—Brisebois & Kruger

[57] ABSTRACT

A pipe of concrete, cement mortar or other cementitious material is formed by an integrally cast cementitious mass which is reinforced with a glass fibre strand or roving forming a substantially helical winding extending around the pipe and incorporated in the cement matrix of the cementitious mass. Preferably there are two windings, one incorporated in the outer periphery of the mass and the other incorporated in the inner periphery of the mass. The pipe is preferably made by a centrifugal casting operation in which a centrifugal casting mould is rotated and the glass fibre strand or roving is fed from a feeding device within the mould and is caused to adhere to the internal peripheral face of the mould and then the feeding device is moved axially along the mould as the mould rotates so that the winding is formed from the roving around the internal peripheral face of the mould. The concrete or other cementitious material is introduced into the mould at the same time as the glass fibre roving or subsequently and the winding becomes incorporated in the cement matrix of the cementitious material as the mould continues to be rotated.

8 Claims, 8 Drawing Figures

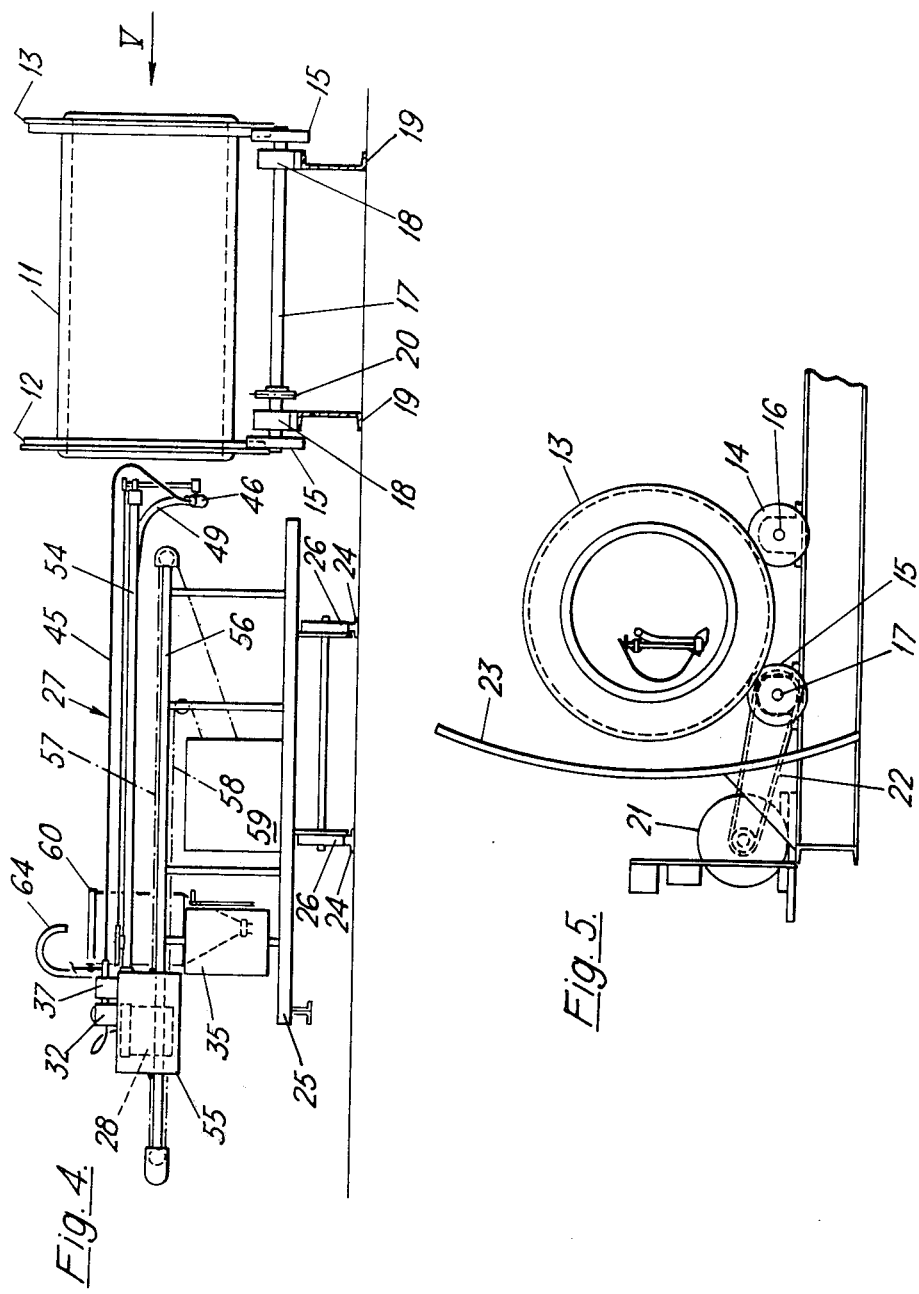

CONCRETE PIPES

This is a division of application Ser. No. 370,145, filed June 14, 1973.

The reinforcement in reinforced concrete pipes is most commonly in the form of cages of steel wire mesh which are cast into the concrete of the pipe when the pipe is formed. Concrete pipes have, however, also been reinforced by wrapping them with a coil of glass fibre strand after the concrete has been cast and has hardened. When this is done, the glass fibre is set in a synthetic resin coating on the pipe in order to bond the glass fibre to the concrete and also to hold the glass fibre in position and protect it.

It has also been proposed to reinforce concrete pipes either by incorporating glass fibre in the wet concrete mix or by a spraying process in which a glass fibre mat is impregnated with a wet concrete or cement mortar mix. In both these techniques chopped fibre is used. In the first technique, the fibres extend in entirely random directions within the concrete and in the second technique the fibres lie in a cylindrical surface, but are still randomly oriented in this surface.

When the concrete which is reinforced with the glass fibre is made using Aluminous cement, ordinary "E" glass fibre can be used for the reinforcement, but with normal Portland cement concrete, alkali-resistant glass fibre must be used because ordinary glass fibre loses its tensile strength to a very considerable extent in the alkaline concrete mix.

The reinforcement of concrete pipes which are to withstand external loads, or internal pressures, or both with either entirely randomly orientated chopped glass fibres or with fibres randomly orientated in a cylindrical surface is inefficient because only a proportion of the fibres increase the tensile strength of the pipe in the directions required to resist the tensile stresses caused by the applied external loads or internal pressure. Indeed, when the orientation is entirely random, as little as one-sixth of the total fibre content may be effective in the required directions and with planar orientation only one-third of the fibre may be effective.

According to this invention, a pipe of concrete, cement mortar, or other cementitious material formed by an integrally cast cementitious mass is reinforced with a glass fibre strand or roving forming a winding extending around the pipe and incorporated and bonded in the cement matrix of the cementitious mass.

When the pipe is required only to withstand a hoop stress generated by internal pressure or otherwise, the winding is preferably incorporated in the outer peripheral layer of the cementitious mass. The peripherally orientated glass fibre is able to resist tensile hoop stresses efficiently and the proportion of the glass fibre in the concrete can therefore be much smaller than that which is necessary when entirely randomly or planar orientated fibre is used.

In order to withstand not only internal pressure, but also bending stresses in the wall of the pipe produced by external loads, preferably a second winding of glass fibre strand or roving is incorporated in the cement matrix of the inner peripheral layer of the cementitious mass. With two layers of glass fibre reinforcement, one in the internal periphery and the other in the external periphery of the pipe, the reinforcing effect is similar to that produced by the customary steel mesh cages. A greater tensile strength than that produced by steel mesh cages can however be achieved and this enables the pipes to be made thinner than steel reinforced pipes of the same strength. Further, because the glass fibre does not have to be protected from corrosion in the same way as steel reinforcement, the protective cover, if any, to the glass fibre may be of a much smaller thickness than is necessary with steel reinforcement so that the overall thickness of the pipe for a given strength may be reduced still more. This results in considerable economy of concrete and also makes the pipes lighter and easier to handle and lay.

In order to impart longitudinal tensile strength to the pipe, additional longitudinally extending glass fibre strand or roving may be introduced, but preferably the winding or each winding of glass fibre strand or roving is laid along a sinusoidal or other wavy path around the pipe so that the winding is able to withstand both circumferential and axial tensile stresses.

Pipes in accordance with the invention may be made, in accordance with another aspect of this invention, by a centrifugal casting operation in which a centrifugal casting mould is rotated and a glass fibre strand or roving is fed from a feeding device within the mould and is caused to adhere to the internal peripheral face of the mould, the feeding device is moved axially along the mould as the mould rotates so that a coil or winding is formed from the strand or roving around the internal peripheral face of the mould and concrete, cement mortar, or other cementitious material is introduced into the mould to form the pipe with the coil or winding incorporated and bonded in the cement matrix of the cementitious mass.

With this method, as the centrifugal mould is spun after the introduction of the concrete, cement mortar or other cementitious material, the centrifugal force acting on the material tends to force the cement matrix of the cementitious mass into intimate contact with the coil or winding and a very satisfactory bond is produced between the glass fibre strand or roving and the cementitious mass.

In order to make a pipe reinforced both externally and internally with glass fibre windings, preferably cementitious material in the form of a neat cement or mortar slurry is introduced into the mould with the glass fibre strand or roving, concrete is subsequently introduced into the mould and forms a concrete body of the pipe as the mould is spun and then a second glass fibre strand or roving is fed from the feeding device onto the internal surface of the concrete and the feeding device is again moved axially along the mould so that a second coil or winding is formed from the strand or roving around the internal peripheral face of the concrete and becomes embedded in the cement matrix of the concrete.

As an alternative to this, the glass fibre strand or roving which forms the external reinforcement of the pipe may be fed into the mould with the mould dry and this strand or roving then becomes incorporated into the cement matrix of the concrete when this is subsequently added. However, the provision of additional neat cement or mortar slurry enriches the cement content of the peripheral portion of the concrete and the pipe and it assists in ensuring that the glass fibre is fully embedded in the cement matrix and that there is a satisfactory bond between the glass fibre and the concrete.

When the second layer of glass fibre reinforcement is applied to the internal face of the concrete, it is not always necessary to apply a second layer of neat cement or mortar slurry because as the concrete is spun in the mould, some cement paste in the concrete tends to flow inwards and in consequence the internal surface of the concrete is already covered with a cement paste layer sufficient to ensure adequate penetration of the glass fibre into its surface.

In order to lay the winding or each winding along a sinusoidal or other wavy path around the pipe when this is required, the strand or roving is fed from the feeding device at a speed greater than the peripheral speed of the internal face of the mould or greater than the peripheral speed of the internal face of the concrete and this causes the strand or roving to adopt the wavy path automatically as the feeding device is moved axially along the mould.

The present invention also includes, according to another of its aspects, apparatus for carrying out the centrifugal casting method and this apparatus comprises a centrifugal pipe mould, a driving mechanism for rotating the mould, a device for feeding a glass fibre strand or roving to the inside of the mould in a position in which the strand or roving impinges on the internal peripheral face of the mould and a mechanism for moving the feeding device axially within the mould.

Preferably the device for feeding the glass fibre strand or roving is also arranged to feed cement grout or slurry and the device comprises a pneumatic conveying tube having at its discharge end an ejector head having a connection for the supply of the grout or slurry and a series of nozzles in the head from which, in use, the grout or slurry issues with an inward inclination so that the jets impinge upon the glass fibre strand or roving issuing from the pneumatic conveying tube to carry the strand or roving along with the grout or slurry and the strand or roving is intimately impregnated with the grout or slurry.

To enable the glass fibre strand or roving to be laid either along a normal helix or along a wavy helical path according to requirements, the apparatus preferably also includes a pair of feed rollers to control the speed at which the glass fibre strand or roving is fed through the pneumatic conveying tube.

The rate at which the feeding device is moved axially within the mould determines the thickness and the pitch of the coil which is built up either on the internal face of the mould or on the internal face of the concrete and the coil may be built up in a single layer by a single traverse of the feeding device along the mould or it may be built up in a number of layers by moving the feeding device backwards and forwards along the mould. For convenience a double traverse is preferably made and the thickness of the winding is controlled by the traversing speed. In either case the glass fibre strand or roving may be laid either as a straight or a wavy helix, the amplitude of the waveform of which can be controlled by controlling the speed of the feed rollers in relation to the peripheral speed of the mould.

The amount of glass fibre in the winding is, of course, dependent upon the pipe strength required. Generally speaking, though, both coils will have a radial thickness of, for example, between 0.1 inch and 0.2 inch.

The glass fibre strand or roving in the winding, or in both the windings when there is a winding on both the external periphery and the internal periphery of the concrete, may be continuous from one end of the pipe to the other or it may be discontinuous and the winding, or each winding, may be built up with a number of sections each consisting of one or more turns of the strand or roving.

The mechanism for moving the feeding device axially within the mould preferably comprises a carriage outside the mould and a mechanism for moving the carriage to and fro along a track which extends parallel to the axis of the mould. The feeding device is then mounted on the carriage and extends from the carriage into the mould.

Instead of making the pipe entirely by a centrifugal casting operation as already described, it may be made by a combination of a vertical casting operation with a centrifugal casting operation. In this technique, a pipe in the form of a thin shell with a single glass fibre winding impregnated with cement mortar or slurry is made by the method already described using mortar or slurry as the cementitious material and, when the cementitious material has hardened, the shell is introduced into a vertical casting mould of which the shell forms the outer peripheral face. Concrete is then introduced between the shell and an internal peripheral face of the mould and is consolidated to form a concrete pipe which is reinforced by the glass fibre strand or roving forming the winding incorporated in the shell which forms the outer peripheral layer of the pipe.

With this technique, a second shell of smaller diameter than the first shell may also be made by the method already described using cement mortar or slurry as the cementitious material and then both shells are introduced into the vertical casting mould so that the shell of larger diameter forms the outer peripheral wall of the mould and the shell of smaller diameter forms the inner peripheral wall of the mould. The concrete is then introduced between the two shells and is consolidated to form a concrete pipe which is reinforced by the glass fibre windings incorporated in the shells which form the outer and inner peripheral layers of the pipe.

Some examples of pipes, of methods of making pipes and also of apparatus for use in carrying out the methods will now be described with reference to the accompanying drawings, in which:

FIG. 4 is a somewhat less diagrammatic side elevation of the apparatus as a whole;

FIG. 5 is an end elevation of the apparatus as seen in the direction of the arrow V in FIG. 4;

Figure 1:
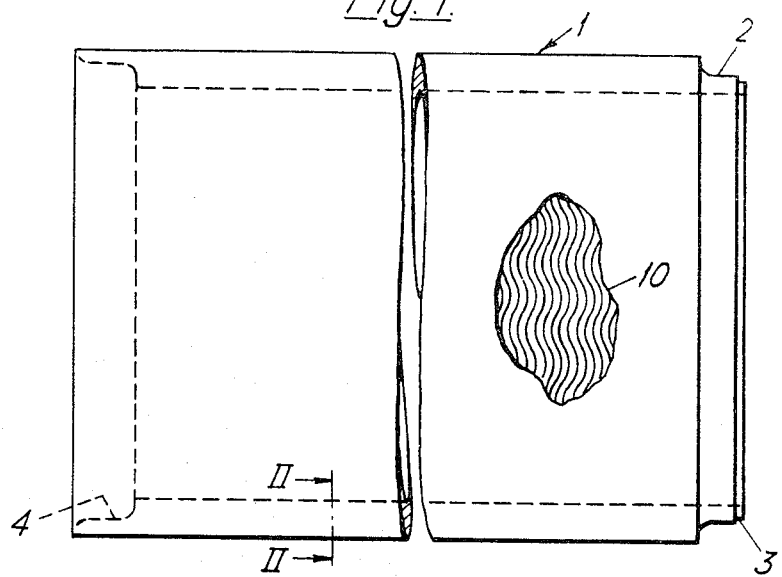
FIG. 1 is a side elevation of a concrete pipe in accordance with the invention with a part of the concrete cut away to show glass fibre reinforcement.
Figure 2:
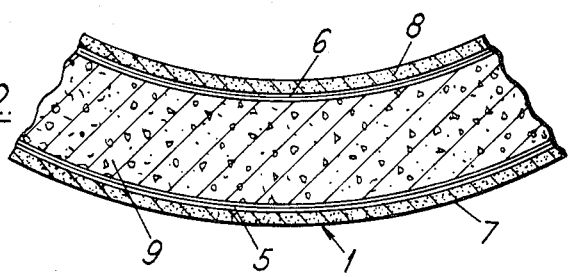
FIG. 2 is a circumferential section through a part of the pipe shown in FIG. 1 as seen in the direction of the arrows on the line II—II in FIG. 1.

A concrete pipe 1 shown in FIGS. 1 and 2 of the drawings is of the Ogee jointed kind with a spigot 2 at one end with a rebate 3 for receiving a sealing ring and a socket 4 at the other end formed within the thickness of the pipe wall. The pipe is reinforced with an outer winding 5 of glass fibre roving and a similar inner winding 6. The windings 5 and 6 are incorporated in outer and inner cement paste layers 7 and 8 respectively forming part of the matrix of concrete 9 of which the wall of the pipe is formed. The windings 5 and 6 may both be of helical form, but in this example the individual turns of both of the windings follow a wavy sinusoidal path as shown at 10 in FIG. 1. The waviness of the windings 5 and 6 ensures that they impart not only circumferential tensile strength, but also axial tensile strength to the concrete 9. The outer winding 5 extends into the part of the concrete wall bounding the socket 4 and similarly the inner winding 6 extends into the spigot 2.

The pipe shown in FIGS. 1 and 2 is made in the apparatus shown in FIGS. 3 to 6 of the drawings. This comprises a conventional centrifugal pipe mould 11 having radially projecting end flanges 12 and 13. The flanges 12 and 13 are each supported on a pair of rollers 14 and 15 which are themselves fixed on shafts 16 and 17 respectively. The shafts 16 and 17 are supported in journal bearings 18 which are fixed on channel bearers 19. The shaft 17 has a chain sprocket 20 fixed on it and this sprocket is rotated by a variable speed electric motor 21 through a driving chain 22. Thus, when the motor 21 is in operation, the rollers 15 are rotated in order to spin the mould 11. The mould 11 is spun in a counterclockwise direction as seen in FIG. 5 and a shield 23 is provided to give protection against any detritus flung centrifugally from the mould.

Figure 6:
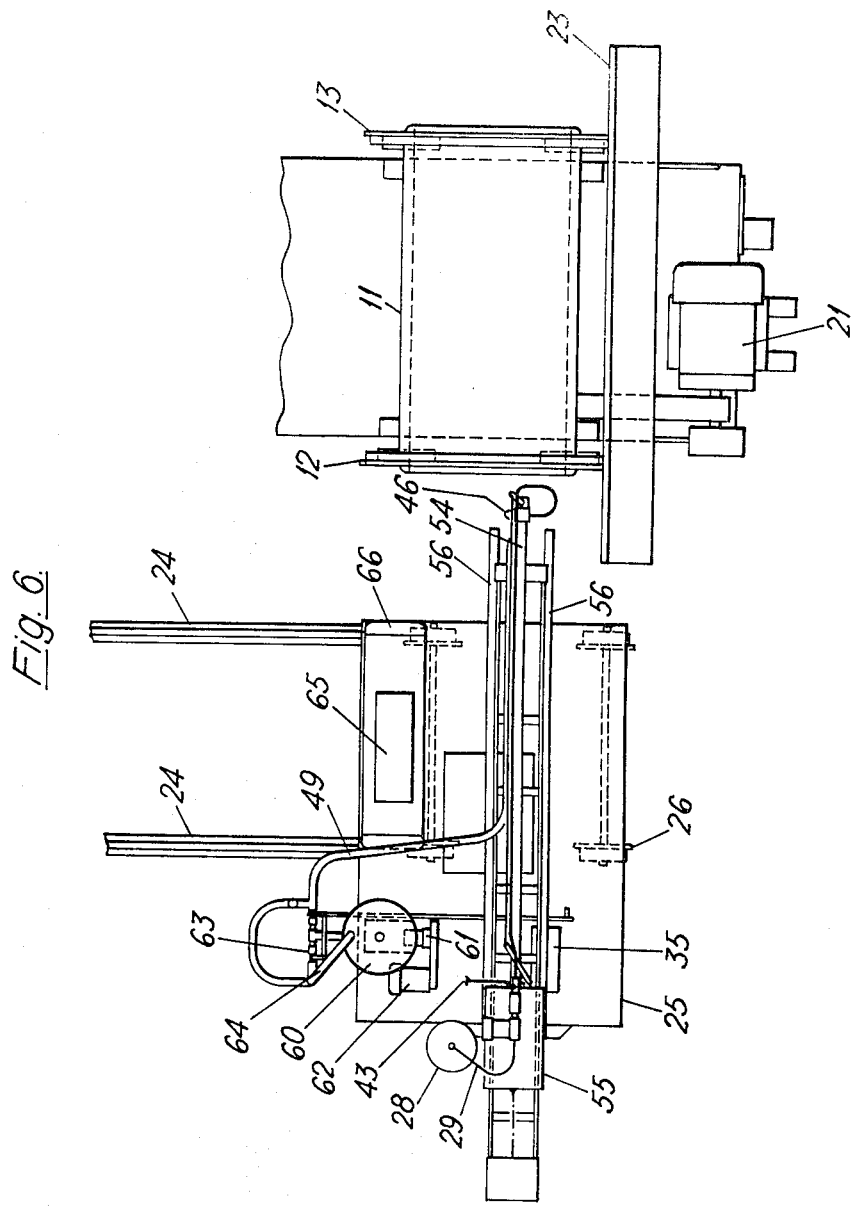
FIG. 6 is a plan view of the apparatus shown in FIGS. 4 and 5.

At the left-hand end of the mould 11 as seen in FIGS. 4 and 6 of the drawings there is a rail track 24 on which a platform 25 with wheels 26 runs. The platform 25 carries a device indicated generally at 27 for feeding a glass fibre roving impregnated with cement slurry to the inside of the mould 11. The provision of the rail track 24 enables the device 27 to be aligned as necessary with the mould 11 and it also enables it to be moved to any one of a series of moulds 11 which are not shown, but which are arranged spaced apart side by side.

Figure 3:
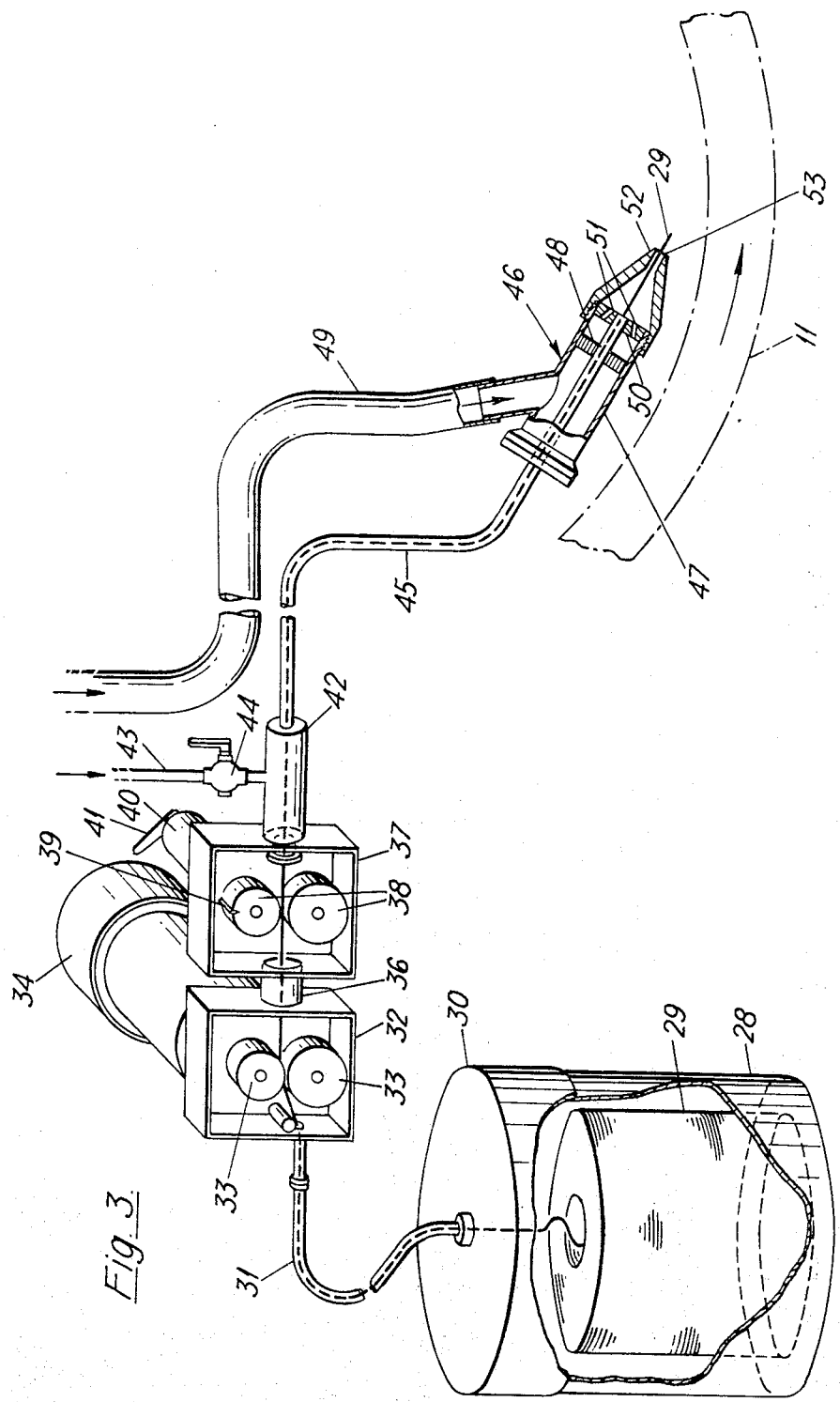
FIG. 3 is a diagrammatic perspective view of part of the apparatus for forming the pipe shown in FIGS. 1 and 2.

Some of the main parts of the device 27 are shown diagrammatically in FIG. 3. The device comprises a bin 28 containing a package 29 of glass fibre roving. The bin 28 has a lid 30 from which a tube 31 extends centrally to a housing 32 containing a pair of feed rollers 33 which are driven by a variable speed electric motor 34 which is electronically controlled by an electronic speed controller 35 shown in FIG. 4. The controller 35 is manually operable to set the speed of the motor 34 relative to that of the motor 21 and hence the speed of the roving 29 relative to the peripheral speed of the mould 11. The controller 35 also monitors the speed of the motor 21 and automatically adjusts the speed of the motor 34 so that, once set, the relative speeds of the roving 29 and of the mould 11 are maintained exactly.

Next to the housing 32 and connected to it by a tube 36 is a second housing 37 containing a pair of cutter rollers 38 the upper one of which carries a knife 39. The cutter rollers 38 are rotated by a motor 40 and are movable towards each other to make them operate by a handle 41.

An air mover 42 which is coaxial with the tube 36 is connected to the housing 37 and has a pipe 43 for the supply of compressed air connected to it. The tube 43 is fitted with a stop-cock 44. A flexible tube 45 leads from the air mover 42 to an ejector head 46.

The ejector head 46 comprises a tubular body 47 concentrically surrounding the end of the tube 45 and between the body 47 and the tube 45 is a filter 48. A flexible slurry supply tube 49 is connected to the annular space between the tubular body 47 and the tube 45. This annular space is closed at the left-hand end as shown in FIG. 3 and at its right-hand end is filled by a nozzle plate 50 provided with four nozzle orifices two of which are shown at 51 and which are uniformly spaced at 90° angular intervals around the axis of the tube 45. As shown in FIG. 3, the nozzle orifices 51 are inclined inwards towards the axis of the tube 45. A conical outlet nozzle 52 having an outlet orifice 53 surrounds the outlets from the orifices 51.

In use, the glass fibre roving from the package 29 extends through the tube 31 and thence through a nip formed between the feed rollers 33 by which the roving is gripped. Thence the roving extends through the tube 36 and freely between the cut-off rollers 38. Thence it extends through the tube 42 into the tube 45 which is a pneumatic conveying tube through which the roving is conveyed by compressed air supplied through the tube 43. The roving issues from the tube 45 in the centre of the nozzle plate 50 and cement slurry is supplied from the tube 49 under pressure through the nozzle orifices 51 so that jets of the slurry impinge upon the roving 29 and both impregnate it thoroughly and also assist in drawing it through the tube 45 so that the impregnated roving issues from the nozzle 53.

As shown diagrammatically in FIG. 3, the axis of the ejector head 46 is arranged at a slight inclination to a tangent of the inner face of the mould 11 so that the impregnated roving 28 is fed onto the internal surface of the mould 11 as the mould rotates. The speed at which the roving 29 issues from the nozzle 53 is dependent upon the speed of the feed rollers 33 which can be controlled by the speed controller 35. The roving 29 can be cut off in lengths as required by operating the handle 41 to move the upper roller 38 and trap the roving between the knife 39 and the periphery of the lower roller 38.

As shown most clearly in FIGS. 4 and 6, the ejector head 46 is supported on the end of a boom 54 extending from a housing 55 which supports the bin 28 and also the housings 32 and 37 on top of it. The housing 55 forms a carriage which slides on rails 56 and has driving chains 57 and 58 attached to it. The driving chains 57 and 58 extend around pulleys and lead to a traversing drive within a housing 59. The traversing drive operating through the chains 57 and 58 moves the housing 55 to and fro along the rails 56 so that the ejector head 46 is moved into the mould 11 as the housing 55 moves towards the right as seen in FIGS. 4 and 6 and the traversing drive is subsequently controlled so that the ejector head 46 is moved axially to and fro within the mould 11.

A slurry feed hopper 60 is supported on the platform 25 and it has a bottom outlet leading to a positive displacement pump 61 which is driven by an electric motor 62. An outlet from the pump 61 is connected through a valve manifold 63 to the flexible tube 49. A recirculating pipe 64 leads from the valve manifold 63 and when the supply of cement slurry to the tube 49 is restricted by partly closing a valve in the manifold, the slurry is recirculated by the pump 61, through the pipe 64 back to the hopper 60 thus enabling the rate of slurry supply to be adjusted.

An air compressor 65 is mounted on top of an air reservoir 66 which is in turn supported from the platform 25. The tube 43 is connected by a further flexible tube, which is not shown, to an outlet of the reservoir 66.

The various motors controlling the device for feeding the roving to the ejector head 46 together with the mould-driving motor 21, the motor 62 and a motor driving the compressor 65 are all controlled by controls on a control panel which is not shown.

In order to form a pipe such as that shown in FIGS. 1 and 2 of the drawings, the mould 11 is set in rotation and the traversing drive 59 is operated to move the ejector head 46 into the mould 11. The supply of compressed air through the tubes 43 and 45 is then started and the feed rollers 33 are set in motion to feed the roving 29 to the ejector head 46. At the same time, the pump 61 is started and the valves in the manifold 43 are set so that cement slurry from the hopper 60 is supplied through the tube 49 to the ejector head 46. The feeding speed of the roving 29 is controlled by means of the feed rollers 33 so that it is somewhat greater than the linear speed of the internal periphery of the mould 11. The roving which is impregnated with cement slurry issuing from the nozzle 53 impinges on the internal surface of the mould 11 and is held there by centrifugal force. As the mould 11 rotates, the head 46 is moved axially along the mould 11 so that a wavy helical winding is formed on the mould. This winding is intimately embedded in the cement slurry which passes through the tube 49 and issues from the nozzle 53 with the glass fibre roving. Thus the layer 7 shown in FIG. 2 is built up and the head 46 is moved axially to and fro a number of times as necessary to build up a winding of the required thickness and number of turns.

When this has been done, the feeding of the glass fibre roving 28 and the cement slurry is stopped and concrete to form the body of the wall 9 is fed, by means of a conveyor not shown, into the mould 11 in the normal way for forming the spun concrete pipes. As the mould 11 is spun, this concrete becomes intimately combined with the outer slurry layer 7.

When the pipe wall has been built up to the requisite thickness, the ejector head 46 is moved back again into the mould 11 and it is operated in the same way as before to build up the winding 6. In this case, however, the supply of cement slurry through the tube 49 is reduced or indeed the roving 29 may be fed dry through the nozzle 53. As the mould 11 continues to be spun, some cement slurry from the concrete 9 tends to migrate radially inwards and this in itself is in some cases sufficient to impregnate the winding 6 and ensure that this is thoroughly incorporated in the inner slurry layer 8.

Figure 7:
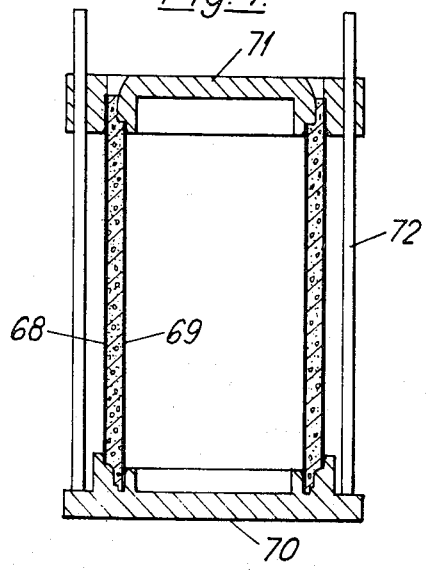
FIG. 7 is a diagrammatic diametric section through a vertical casting mould with a pipe being cast in it; and, FIG. 8 is a radial section to a larger scale of a part of the pipe shown in FIG. 7.
Figure 8:
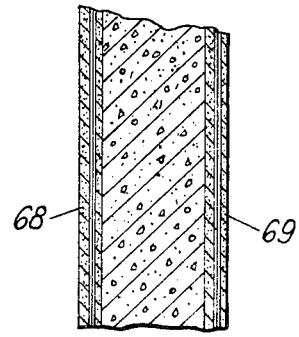

In order to form a vertically cast concrete pipe as shown in FIGS. 7 and 8 of the drawings, a thin concrete shell 68 is first formed in the apparatus shown in FIGS. 3 to 6 of the drawings by forming a slurry impregnated winding similar to the winding 5 on the outside of the pipe shown in FIGS. 1 and 2. This is formed by feeding glass fibre roving and slurry through the ejector head 46 into a mould similar to the mould 11, and then continuing to spin the mould whilst allowing the slurry to set with the usual centrifugal casting technique, but without subsequently adding any concrete to the mould. When the shell has become sufficiently self-supporting in the mould 11, the mould 11 is removed from the spinning rollers 14 and 15 and is set aside to allow the shell to harden. At this time a second shell 69 is formed in a similar manner, but using a centrifugal casting mould of a smaller diameter.

When the shells 68 and 69 are sufficiently strong, they are placed in the vertical casting mould shown in FIG. 7 which comprises a bottom plate 70 and a top plate 71 which is slidable by a mechanism not shown upwards and downwards on guide rods 72. To place the shells 68 and 69 in position, the plate 71 is raised, the shells 68 and 69 are set, one inside the other on the bottom plate 70 and the top plate 71 is then lowered into the position shown in the drawing. When this has been done, concrete is introduced into the annular space between the shells 68 and 69 and is vibrated to consolidate it. The concrete is then allowed to set and harden and the pipe is then removed from the casting mould.

If it is required to make a pipe with only a single glass fibre winding near its outer periphery, the shell 68 is made and is placed in the mould shown in FIG. 7 together with a steel mould tube which takes the place of the shell 69. The concrete is then cast as before, but when it has set and obtained sufficient strength, the tube which takes the place of the shell 69 is removed.

In one example of the manufacture of a pipe similar to that shown in FIGS. 1 and 2 and having a length of 3 metres, an internal diameter of 900 mm and a wall thickness of 65 mm, using the apparatus shown in FIGS. 3 to 6 of the drawings, the mould 11 had an internal diameter of 1,030 mm and was fitted with shaped ends to form the Ogee or in-wall spigot and socket joint as shown. The mould was rotated at a speed of from 80 to 85 r.p.m. giving a peripheral speed of from 4.31 to 4.58 metres per second. A single roving of Cem-FIL alkaline-resistant glass fibre consisting of about 6,000 untwisted continuous filaments of 13 microns in diameter was fed to the head 46 at a speed 10% above the peripheral speed of the mould, that is from 4.74 to 5.04 metres per second. The speed of the roving was accurately controlled by the feed rolls 33, which were themselves controlled by a sensing device monitoring fluctuations in the rotational speed of the mould.

A Portland cement slurry having a water:cement ratio of 0.46:1 was pumped through the pipe 49 to the head 46 where it passed through the nozzles 51 at a speed somewhat higher than that of the roving. The roving met the slurry at the confluence of the jets from the nozzles 51 and owing to the turbulence caused by the jet impingement and because the jet velocity was higher than the speed of the roving, very efficient mixing of the slurry into the roving took place. The roving and slurry passed through the nozzle 53 with the roving only forming a relatively small fraction of the total material. The nozzle 53 was arranged at a distance of between 5 and 10 centimetres from the internal periphery of the mould 11.

The head 46 was moved once along the length of the mould 11 parallel to its axis of rotation and then back again at a speed dependent upon the amount of fibre reinforcement required in order to build up the winding 5. The angle of the head 46 was adjusted at the socket end of the pipe to ensure that the stream of slurry and glass fibre roving entered the part of the pipe surrounding the socket.

After the movement of the head 46 to and fro once along the mould, a 1:2:4 concrete mix with a crushed granite graded aggregate up to ¾ inch maximum size was loaded into the mould in exactly the same manner as is conventional in the manufacture of spun concrete pipes. The amount of concrete added was such that after compaction approximately 60 mm of the wall thickness of the pipe had been built up. The speed of rotation of the mould was then increased to generate centrifugal compaction forces and to de-water the concrete and slurry, again in a manner similar to that used in conventional spun concrete pipe manufacture.

Next the mould was slowed down again to a speed of 80 to 85 r.p.m. and further glass fibre roving and slurry was ejected from the head 46 as this was again moved once to and fro along the mould. The slurry and fibre speeds were reduced to match the smaller diameter and consequently the smaller peripheral speed of the internal face of the concrete. This formed the second winding 6.

A layer of dry 2:1 granite dust and cement was added to build up the pipe to its required wall thickness of 65 mm and to form a wearing layer on the bore of the pipe. The speed of the mould was then again increased for a short period to compact this layer and finish off the pipe in the usual way.

The spinning was then stopped and the pipe and mould were removed to a steam chamber for a 12 hour curing period followed by de-moulding and a 28 day air cure before the pipe was ready for use.

The shells 68 and 69 forming part of the pipe shown in FIGS. 7 and 8 can be made in a manner similar to the formation of the outer winding 5 in the example just described. That is to say the slurry and glass fibre roving are supplied to a mould in the same way, and no concrete is added and after the winding has been formed, this is followed only by de-watering steam curing and de-moulding.

I claim:

1. Apparatus for making a pipe comprising a body formed by an integrally cast mass of cementitious material including a cement matrix and a glass fibre roving reinforcing said body, said roving forming a winding extending around said body along the length thereof, said roving being incorporated in said cement matrix, said apparatus comprising a centrifugal pipe mould, means for rotating said mould, means for feeding a glass fibre roving to the inside of said mould in a position in which said roving impinges on an internal peripheral face of said mould and means for moving said feeding device axially within said mould.

2. Apparatus as claimed in claim 1, wherein said means for feeding said glass fibre roving includes means for feeding cement slurry and said means for feeding said glass fibre includes a pneumatic conveying tube having an inlet end and a discharge end, an ejector head at said discharge end of said pneumatic conveying tube, means for supplying slurry to said head, means defining a series of nozzles in said head for directing jets of said slurry to impinge upon said glass fibre issuing from said discharge end of said pneumatic conveying tube and guide means surrounding said slurry jets and said roving to guide said slurry and said roving onto said internal peripheral face of said mould.

3. Apparatus as claimed in claim 2, wherein said means for feeding said glass fibre roving includes a pair of feed rollers for said roving, means for driving said feed rollers and means for controlling said driving means to control the speed at which said glass fibre roving is fed through said pneumatic conveying tube.

4. Apparatus as claimed in claim 3, wherein said means for moving said feeding means axially within said mould includes a carriage outside said mould, a rail track extending parallel to said mould and supporting said carriage, a mechanism for moving said carriage to and fro along said rail track and means extending from said carriage into said mould.

5. Apparatus for making a tubular body comprising an integrally and centrifugally cast mass of cementitious material including a matrix of inorganic cement and glass fibre strand or roving reinforcing said mass and forming a winding which extends around said body and is incorporated and bonded in said matrix, said apparatus comprising centrifugal mold means, a driving mechanism, means operatively connecting said driving mechanism to said mold means for spinning said mold means, a feeding device including means for impregnating a glass fibre strand or roving with cementitious slurry and means for positively feeding said glass fibre strand or roving after impregnation to the inside of said mold means at a speed at least as great as the internal peripheral speed of said mold means as said mold means is spun by said driving means, said strand or roving being fed by said feeding device in a position in which said strand or roving impinges on said internal peripheral face of said mold means, and means for moving said feeding device within said mold means in a direction parallel to an axis about which said mold means is spun.

6. Apparatus as claimed in claim 5, wherein said feeding device includes a pneumatic conveying tube having an inlet end and a discharge end, means for conducting said glass fibre strand or roving into said inlet end, an ejector head at said outlet end of said pneumatic conveying tube, means for supplying cementitious slurry to said ejector head and a series of nozzles in said head operatively connected to said means for supplying said slurry whereby slurry issues in jets from said nozzles with an inward inclination towards said strand or roving and said jets impinge upon said strand or roving issuing from said pneumatic conveying tube to impregnate said strand or roving with slurry and carry said strand or roving along with said slurry jets.

7. Apparatus as claimed in claim 6, wherein said feeding device further comprises a pair of feed rollers, a nip formed between said feed rollers, means for rotating said feed rollers at a constant but adjustable speed and means for directing said strand or roving through said nip whereby said rollers control the speed at which said glass fibre strand or roving is positively fed through said pneumatic conveying tube.

8. Apparatus as claimed in claim 5, wherein said means for moving said feeding device within said mold means comprises a track outside said mold means, said track extending in a direction parallel to said axis, carriage means mounted on said track, means for moving said carriage means to and fro along said track, means fixed to said carriage means and extending from said carriage means into said mold means and means mounting said impregnating means and said positive feeding means on said means extending into said mold means.

* * * * *